(12) United States Patent
Cypher

(10) Patent No.: US 7,318,114 B1
(45) Date of Patent: Jan. 8, 2008

(54) SYSTEM AND METHOD FOR DYNAMIC MEMORY INTERLEAVING AND DE-INTERLEAVING

(75) Inventor: Robert E. Cypher, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 335 days.

(21) Appl. No.: 10/978,249

(22) Filed: Oct. 29, 2004

(51) Int. Cl.
*G06F 12/00* (2006.01)

(52) U.S. Cl. .............................. 711/3; 711/5; 711/127; 711/157; 711/165; 711/202

(58) Field of Classification Search .................... 711/3, 711/5, 127, 157, 165, 202
See application file for complete search history.

(56) References Cited

U.S. PATENT DOCUMENTS

| | | |
|---|---|---|
| 4,189,767 A | 2/1980 | Ahuja |
| 4,853,846 A | 8/1989 | Johnson et al. |
| 5,530,837 A | 6/1996 | Williams et al. |
| 6,381,668 B1 | 4/2002 | Lunteren |
| 6,473,845 B1 | 10/2002 | Hornung et al. |

OTHER PUBLICATIONS

Office Action from European Patent Application No. 05256336.8, filed Oct. 12, 2005, whose inventor is Robert Cypher.
"Using Hardware Counters to Automatically Improve Memory Performance"; Mustafa M. Tikir & Jeffrey K. Hollingsworth; Computer Sciences Department, University of Maryland, College Park, MD; pp. 1-12.

*Primary Examiner*—Jack A. Lane
(74) *Attorney, Agent, or Firm*—Meyertons Hood Kivlin Kowert & Goetzel, P.C.; Stephen J. Curran

(57) ABSTRACT

In one embodiment, a system includes a plurality of memory controllers each coupled between a processor and a respective memory. Each memory controller includes a plurality of decoders. Each decoder of a given memory controller may be independently configurable to match on a respective value of a subset of address bits such as the low-order cache line address bits, for example, received in a memory request. In one specific implementation, the number of decoders included on a given memory controller may correspond to the number of ways in which the memory is interleaved.

20 Claims, 4 Drawing Sheets

SYSTEM AND METHOD FOR DYNAMIC MEMORY INTERLEAVING AND DE-INTERLEAVING

BACKGROUND OF THE INVENTION

1. Field of the Invention

This invention relates to system memory configurations and, more particularly, to the interleaving and de-interleaving of memory.

2. Description of the Related Art

As computer system processors have reached higher performance levels, the need for faster memories has become more evident. However, gains in processor performance have far outpaced gains in memory device performance. Accordingly, various techniques have been employed in an attempt to improve the memory system performance.

For example, in many cases, memory access time may be critical to the satisfactory operation of a particular software application. Depending on the system configuration and size, a computer system may have one or more memory controllers that control multiple banks of memory. In some cases, the way the data is stored in memory may cause bottlenecks. For example, if a particular region or bank of memory is accessed heavily, it may create bandwidth issues and increase latencies which contribute to degraded system performance.

One technique that is used to improve memory latencies and distribute bandwidth is known as interleaving. Interleaving refers to mapping consecutive cache line addresses to different banks, or in multi-memory controller systems, to different memory controllers. In some conventional systems, memory may be interleaved using memory controllers that include a hardware mapper that may match on a given address. The mapper may determine which addresses are mapped to which hardware entity (e.g., bank). Thus, the memory controller mapper can be configured to interleave accesses to consecutive cache line addresses. However, in such conventional systems, it becomes problematic to efficiently interleave a non-power of two number of hardware entities.

SUMMARY

Various embodiments of a system and method for dynamic memory interleaving and de-interleaving are disclosed. In one embodiment, the system includes a plurality of memory controllers each coupled between a processor and a respective memory. Each memory controller includes a plurality of decoders. Each decoder of a given memory controller may be independently configurable to match on a respective value of a subset of address bits such as the low-order cache line address bits, for example, received in a memory request.

In one specific implementation, the number of decoders in a given memory controller may correspond to the number of ways in which the memory is interleaved.

Figure 1:
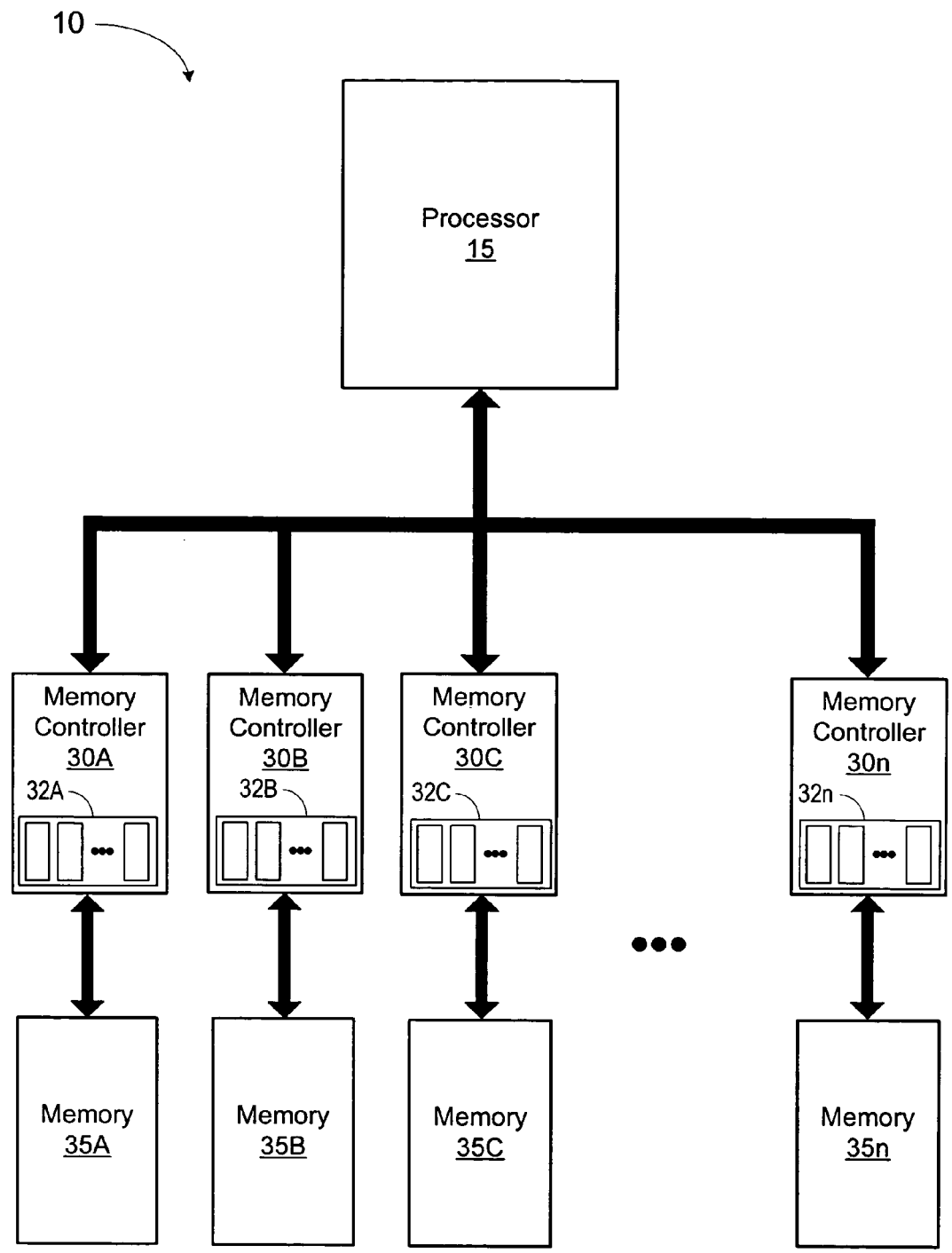
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Turning now to FIG. 1, a block diagram of one embodiment of a computer system is shown. Computer system 10 includes a processor 15 coupled to a plurality of memory controllers designated 30A through 30n. Further, each memory controller 30 is coupled to a respective memory designated 35A through 35n. It is noted that n is used to illustrate that any number of memory controllers may be used. It is further noted that in other embodiments, other numbers of processors 15 may be used, such as in a multi-processor system, for example.

In one embodiment, processor 15 may be illustrative of a processor in the UltraSparc™ family of processors, for example. However, in other embodiments, processor 15 may be illustrative of any type of processor. While processor 15 may execute program instructions for general purpose computing, it is contemplated that processor 15 may also execute program instructions that configure memory controllers 30A-30n. For example, as will be described further below, processor 15 may configure memory controllers 30A-30n using one or more configuration registers, to operate in either an interleaved mode or a de-interleaved (i.e., non-interleaved mode). It is noted that in other embodiments, an additional system or "service" processor (not shown) may be used for system monitoring and configuration purposes.

Memories 35A-35n may be any type of memory such as a memory implemented using devices in the dynamic random access memory (DRAM) family of devices. For example, in one embodiment, memories 35A-35n may be implemented using removable memory modules including one or more DRAM devices. In other embodiments, the DRAM devices may be mounted directly to a motherboard. The DRAM devices may also be configurable to operate in a banked arrangement. For example, a given memory such as memory 35A may be configured into one or more banks. It is noted that in one embodiment, the banks may be external banks that include one or more of DRAM devices. In other embodiments, the banks may be internal to each DRAM device. In still other embodiments, the bank arrangement may be a combination of internal and external banks.

Each of memory controllers 30A-30n may control accesses to their respective memories 35. For example, in response to a memory transaction request including a cache line address sent by processor 15, one of the memory controllers will match on the cache line address. In one embodiment, a cache line may include 64 bytes. In such an embodiment, a cache line address may correspond to 64 consecutive bytes of data. It is noted that in other embodiments, other numbers of bytes of data may correspond to a single cache line address.

In the illustrated embodiment, each of memory controllers 35 includes a programmable or configurable memory mapping function. In one embodiment, each memory controller 30 may map a substantially equal portion of the total address space allocated to memories 35A-35n. The mapping functionality of each memory controller may be implemented, at least in part, in a number of hardware decoders 32A-32n, respectively. Each of the decoders may map a memory region of a given size. Further, each decoder 32 may be configurable to map which addresses are mapped to which physical memory. For example, each of the hardware decoders may include programmable decode logic, such as one or more registers (not shown in FIG. 1), that are configured to match on certain bits of a cache line address associated with an incoming memory request. The registers are sometimes referred to as mask and match registers, where the mask registers may determine which bits to use in the cache line address and the match registers may determine what the value of those bits will be for a match.

Figure 2:
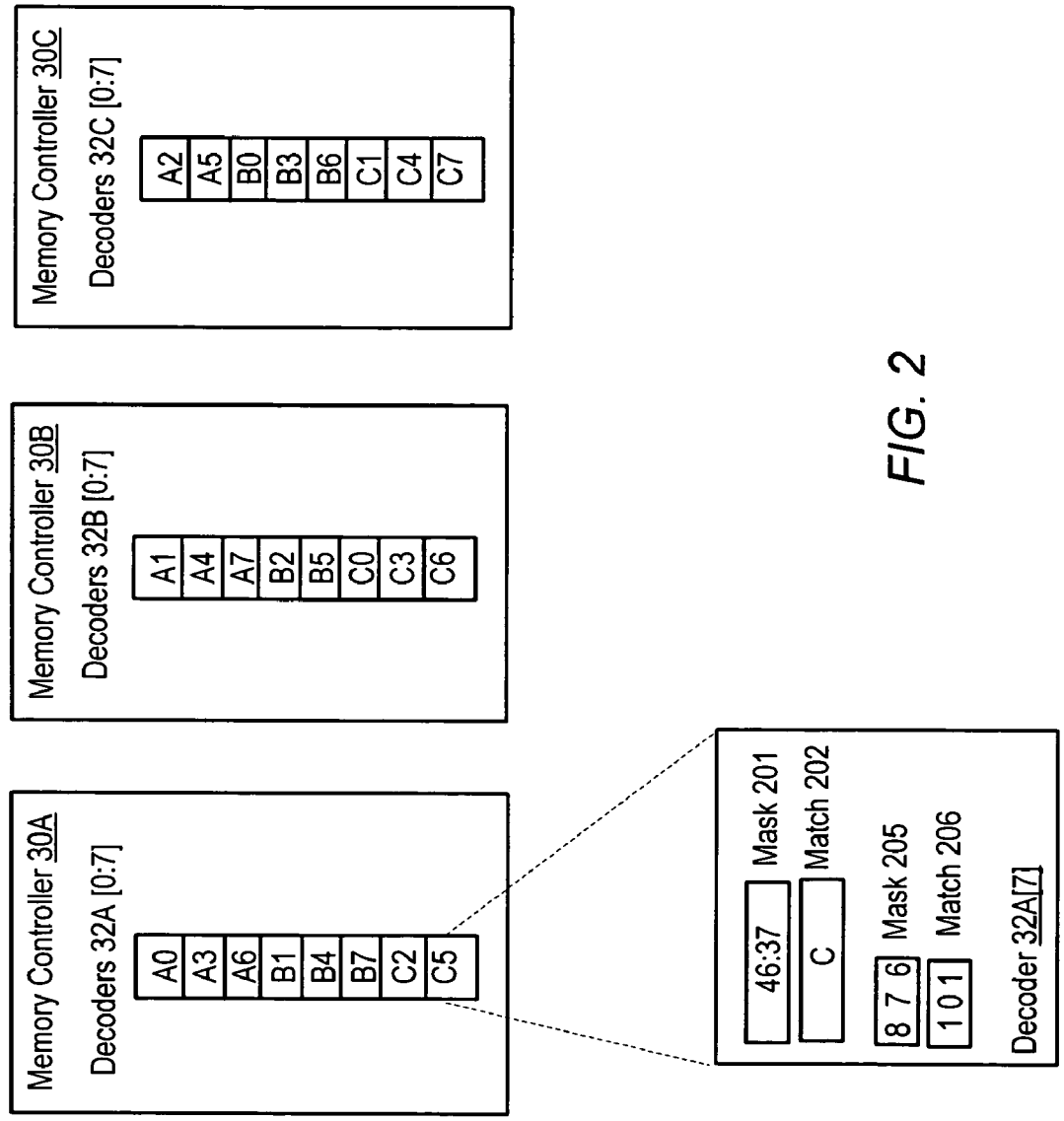
FIG. 2 is a diagram illustrating an exemplary interleaving of memory using three memory controllers.

Memory controllers 30A-30n may be configured to operate in an interleaved mode such that consecutive cache line addresses are typically not mapped by the same memory controller. For example, a given cache line address may be mapped to memory 35A by memory controller 30A. However, the next consecutive cache line address may be mapped to memory 35B by memory controller 30B. To illustrate, in a system having eight memory controllers, nine consecutive cache line addresses may be mapped by the memory controllers as follows: The first eight cache line addresses may map to memories 30A, 30B, 30C, . . . 30n and the ninth maps back to 30A. In systems that include a single memory controller, the interleaving may be applied at the bank level such that consecutive cache line addresses do not map to the same bank. An exemplary eight-way interleaving using three memory controllers is shown in FIG. 2.

In one embodiment, there may be eight decoders 32 in each memory controller 30 and a given memory 35 may correspond to (i.e., map) a segment of addressable memory. Since each decoder may be configurable to map which addresses are mapped to which physical memory, suitable selections of decoder registers may allow for efficient interleaving on non-power-of-two hardware entities. More generally, by having a power-of two number of decoders 32 on each memory controller 30, it may be possible to interleave between any arbitrary number of memory controllers. It is noted that although eight decoders are used in the examples described throughout, it is contemplated that a memory controller may include other numbers of decoders. For example, 'W' decoders may be used, where W is a power-of two and may represent the maximum interleaving supported.

In one implementation, a memory controller may include more decoders than are in use at a given time. The additional decoders may be selected and used depending upon the density of the DRAM devices that are supported in the corresponding memory. For example, if higher density DRAM devices are used in a given memory, 16 decoders may be selectably used on the memory controller that controls that memory, while eight decoders may be used to control the memories with lower density DRAM devices.

Memory controllers 30 may also be configured to operate in a de-interleaved mode by changing the mappings in the decoders. Each of memory controllers 30A-30n may be configured such that consecutive cache line addresses may be mapped by the same memory controller. For example, in a system having eight memory controllers, if each memory controller maps one eighth of the total address space allocated to memories 35A-35n, then memory controller 35A maps the first eighth, memory controller 35B maps the second eighth, and so on. Thus, each memory controller may map consecutive cache line addresses within the range of addresses allocated to its corresponding respective memory. It is noted that the number of decoders in each memory controller corresponds to the number of ways that the memory is interleaved.

For various reasons (e.g., adding or removing memory/memory controllers, optimizing memory interleaving), it may be desirable to reconfigure memory controllers 30A-30n during operation of computer system 10. Reconfiguration of the memory system during operation is sometimes referred to as dynamic reconfiguration (DR). During a DR, the mappings associated with at least some of the decoders within the memory controllers may need to be changed. In the illustrated embodiment, changing the mappings of the decoders may be accomplished by directly moving from one mapping to another mapping. This is described in greater detail below in conjunction with the descriptions of FIG. 3 and FIG. 4, which illustrate exemplary dynamic re-interleaving when a memory controller is added or removed, respectively.

When no memory controllers or memory is being added or removed from the system, switching between the interleaved and de-interleaved states may be referred to as "in-place" interleaving and de-interleaving. Generally, when performing an in-place interleave or de-interleave, the mapping configuration in decoders 32A-32n may be changed and the data stored in the corresponding physical locations of memories 35A-35n may be moved. In conventional systems, this may create a complex cycle of creating new mappings and moving the corresponding data. However in the illustrated embodiment, a DR may be accomplished and the interleaving may changed by directly moving the addresses (i.e., directly remapping the addresses) mapped by a given decoder to another decoder, possibly in another memory controller.

Turning to FIG. 2, a diagram illustrating an exemplary interleaving of memory using three memory controllers of FIG. 1 is shown. Components corresponding to those illustrated in FIG. 1 have been numbered identically for clarity and simplicity. Memory controller 30A, 30B and 30C each include eight decoders, designated decoders 32A[0:7], 32B[0:7] and 32C[0:7], respectively.

As described above, in one embodiment each memory controller (e.g., memory controller 30A) controls access to a respective memory (e.g., memory 35A) and each decoder maps a given region of memory. In the following example, each memory 35 may represent a 128 GB memory segment. Three memory segments designated segment A, segment B and segment C are shown. Since each memory controller includes eight decoders, and each decoder may map a fixed-sized region, this implies that each decoder maps $\frac{1}{8}^{th}$ of a segment or 16 GB. The memory is being interleaved eight ways using three memory controllers. Using this configuration, we will always have a multiple of eight decoders and thus a power-of-two number of decoders per segment. Thus, interleaving may be accomplished as efficiently as possible, regardless of the number of memory controllers.

In the illustrated embodiment, the three memory segments A, B and C are divided into ⅛ths (e.g., A[0:7], B[0:7] and C[0:7]) and interleaved across the three memory controllers. The pieces are interleaved such that A0, A3, A6, B1, B4, B7, C2 and C5 are mapped by decoders 32A[0:7] of memory controller 30A. Similarly, decoders 32B[0:7] of memory controller 30B map A1, A4, A7, B2, B5, C0, C3 and C6. Decoders 32C[0:7] of memory controller 30C map A2, A5, B0, B3, B6, C1, C4 and C7. It is noted that the decoder mappings are arbitrary. Furthermore, in other embodiments, the interleaving may be performed at levels other than segments (e.g., the block level).

In the illustrated embodiment, decoder 32A[7] of memory controller 30A is shown in greater detail. Decoder 32A[7] may be representative of any of the decoders 32A-32n of FIG. 1. Decoder 32A[7] includes a pair of mask registers 201 and 205, and a pair of match registers 202 and 206. Depending on the implementation, a memory request may be routed to each memory controller in a multicast arrangement such that all decoders may be presented with the same cache line address. Each decoder 32 may be programmed to match on certain cache line addresses. In one embodiment, mask register 201 may be programmed to specify which bits of the cache line address are significant and match register 202 may be programmed to specify the particular encoding that matches the range of cache line addresses mapped to the decoder. In the illustrated embodiment, mask register 201 and match register 202 of decoder 32A[7] have been configured to match on bits 46:36 of the physical address, which corresponds to memory segment C. In addition, mask register 205 and match register 206 of decoder 32A[7] have been configured to match on bits [8:6] of the physical address, which corresponds to interleave way five. Consequently, it is noted that in the illustrated embodiment, bits [8:6] of the physical address correspond to the low order cache line address bits. Accordingly, a request including a cache line address corresponding to segment C5, is mapped by decoder 32A[7] and a request including a next consecutive cache line address (e.g., segment C6) may be mapped by decoder 32B[7], and so on.

It is noted that the illustrated interleaving is only an exemplary interleaving and that other interleavings are possible and contemplated. For example, in one embodiment, the decoders may be configured differently by programming the mask and match registers with different values. It is further noted that the selection of which decoders map which segment may be determined as part of the creation of the interleave maps. However, in one embodiment, during the determination of the mapping it may be desirable to minimize remapping as much as possible during a DR. In addition, it may be desirable to maximize the interleaving to obtain as nearly as possible eight way interleaving.

Figure 3:
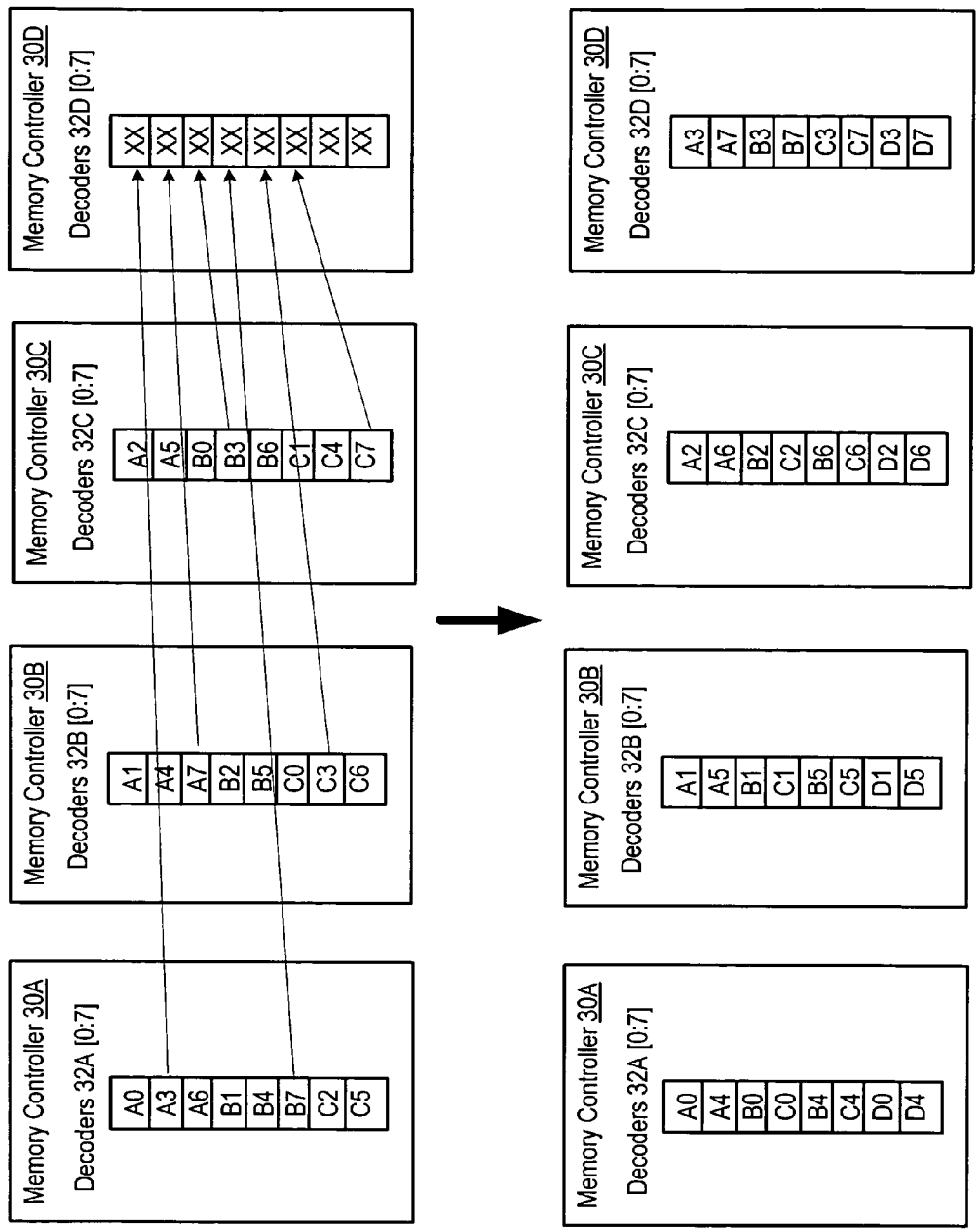
FIG. 3 is a diagram illustrating a re-interleaving of memory after a memory controller is added to the configuration of FIG. 2.

As described above, for a variety of reasons it may be necessary to add memory capacity. In FIG. 3 a fourth memory controller 30D and corresponding memory segment D is added to the configuration shown in FIG. 2. To accommodate the addition of the memory, the decoders may be dynamically reconfigured and the memory re-interleaved on-the fly.

Referring to FIG. 3, a diagram illustrating a re-interleaving of memory after a memory controller is added to the configuration of FIG. 2 is shown. Components corresponding to those illustrated in FIG. 1 and FIG. 2 have been numbered identically for clarity and simplicity. Memory controller 30A, 30B, 30C and 30D each include eight decoders, designated decoders 32A[0:7], 32B[0:7], 32C[0:7] and 32D[0:7], respectively.

In the top group of four memory controllers, memory controller 30D has been added. To re-interleave the memory, a new mapping may be created. The new mapping may include 4 memory segments interleaved eight ways using 32 decoders.

In one embodiment, the new mapping may be determined by processor 15 of FIG. 1. Alternatively, a service processor (not shown) may determine the new mappings. In either case, once the new mapping has been determined, the re-interleaving may include directly moving the mapping from some existing decoders to decoders in the new memory controller and between existing decoders. In addition, the data stored at those addresses may also be moved.

In one embodiment, selected mappings associated with memory controller 30A, 30B and 30C may be moved to the new memory controller 30D. This is illustrated by the arrows in the top grouping of memory controllers of FIG. 3. More particularly, mappings for A3 and B7 are moved from memory controller 30A, mappings for A7 and C3 are moved from memory controller 30B, and mappings for B3 and C7 are moved from memory controller 30C. Since these mappings have been moved, the decoders that used to map those addresses are now available to map different addresses. Accordingly, the remaining mappings may be moved from one decoder to another, either in a different memory controller or in the same memory controller. Further, the remaining decoders of all the memory controllers may be configured with the mappings for memory segment D.

The bottom grouping of memory controllers illustrates one embodiment of a new mapping after re-interleaving is complete. It is noted that in other embodiments, the mappings may be different. It is also noted that some of the mappings were not moved. Specifically, the addresses mapped by decoders [0] and [4] of each of memory controllers 30A, 30B and 30C were not changed.

Figure 4:
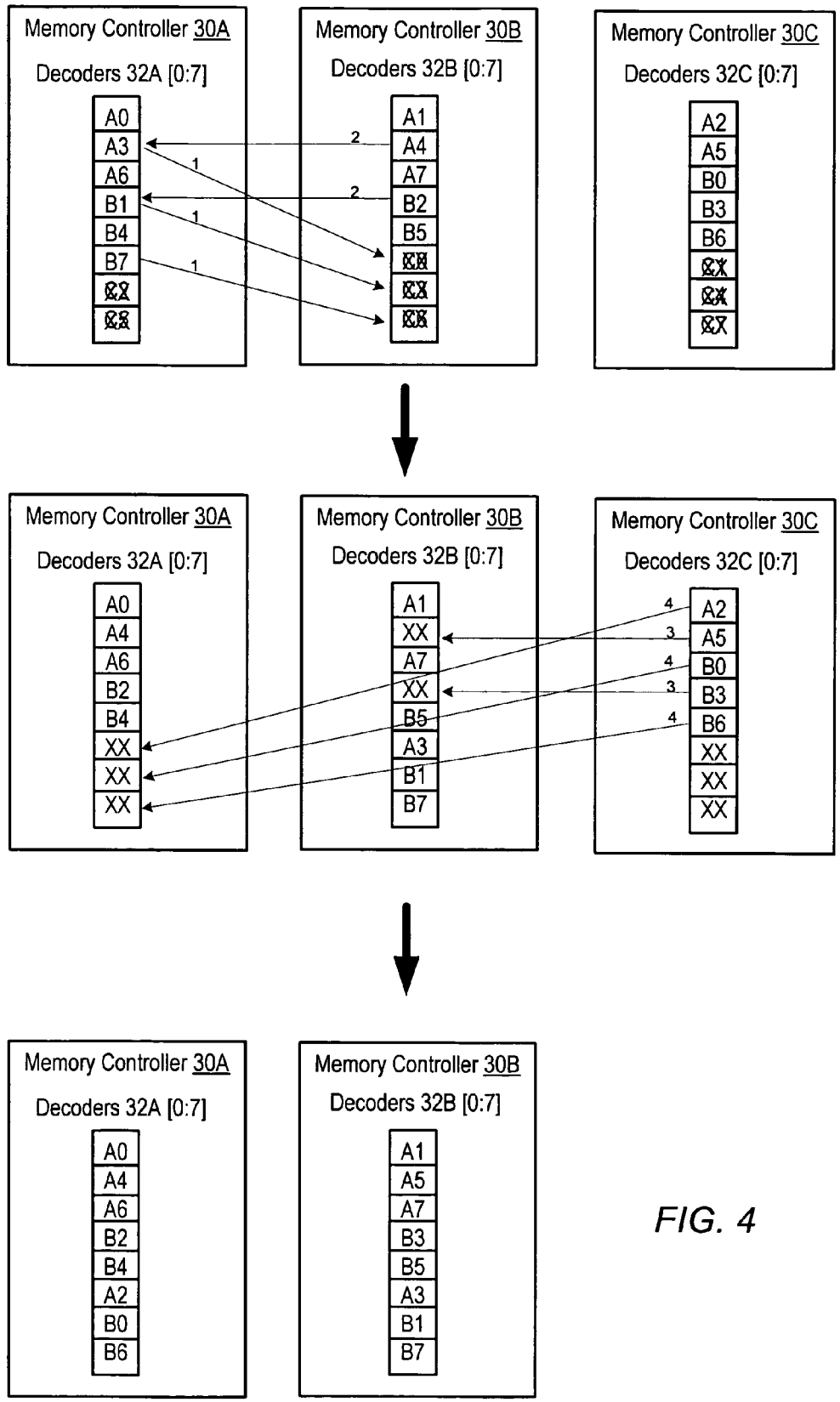
FIG. 4 is a diagram illustrating a re-interleaving of memory after a memory controller is removed from the configuration of FIG. 2

FIG. 4 illustrates a diagram of a re-interleaving of memory after a memory controller is removed from the configuration of FIG. 2. Components corresponding to those illustrated in FIG. 1 and FIG. 2 have been numbered identically for clarity and simplicity. Memory controller 30A, 30B and 30C each include eight decoders, designated decoders 32A[0:7], 32B[0:7] and 32C[0:7], respectively.

As described above, when a memory controller is DR'ed out a new mapping is determined. Once the new mapping is determined, the addresses mapped by selected decoders may be moved appropriately. In the illustrated embodiment, memory controller 30C is being removed. As such, memory segment C is deallocated, thereby freeing up any decoders that mapped segment C. More particularly, decoders 32A [6:7] and decoders 32B[5:7] are now free as indicated by the XX in the maps in the top row of memory controllers.

In one embodiment, the addresses mapped by the remaining decoders may now be moved to different decoders as determined by the new mapping. For example, in the embodiment of FIG. 4, the odd ways may be mapped by the decoders in memory controller 30B. As such the odd ways mapped by decoders in memory controller 30A are moved to the decoders in memory controller 30B as shown by the arrows labeled with a number 1. Next, the even ways that are currently mapped by decoders in memory controller 30B are moved to the decoders in memory controller 30A. This is depicted by the arrows labeled with a number 2. In the illustrated embodiment, all moves between memory controller 30A and 30B are complete.

In the second row, addresses mapped by decoders in memory controller 30C are moved to the appropriate decoders in memory controllers 30A and 30B as indicated by the arrows numbered 3 and 4. It is noted that the numbering of the arrows is arbitrary and only for discussion purposes. It is contemplated that the mapped addresses may be moved between decoders in any order as desired.

The third row illustrates one embodiment of a completed re-interleaving after memory controller 30C is removed. It is noted that in other embodiments, the mappings may be different. It is also noted that similar to the description of FIG. 3 above, some of the decoder mappings of FIG. 4 were not moved. Specifically, the addresses mapped by decoders 32A[0], [2] and [4], decoders 32B[0], [2] and [4] were not changed.

In one implementation, the computer system 10 may include a transaction-based protocol (not shown) and corresponding commands that may accommodate the moving of decoder mappings from one decoder to another, which may further simplify interleaving during a DR. In such an implementation, a set of interleave commands may be used to move an address from one decoder to another. In addition, the commands may allow the data associated with the mapped addresses to be moved to the corresponding memory. However, in various other embodiments, any suitable method may be employed to cause the maps to be moved from one decoder to another as desired.

It is noted that in an alternative embodiment, the memory requests may be sent from processor 15 using a point-to-point protocol. In such an embodiment, mask and match functionality described above may also be included within routing switches (not shown) to enable the requests to reach the correct memory controller.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a processor;
a plurality of memories; and
a plurality of memory controllers each coupled between the processor and a respective one of the plurality of memories;
wherein each memory controller includes a plurality of decoders, wherein each decoder of a given memory controller is independently configurable to match on a respective value of a subset of address bits received in a memory request, thereby mapping a given cache line address; and
wherein in response to execution of one or more reconfiguration commands, the plurality of memory controllers is configured to be dynamically reconfigured during system operation by moving a cache line mapping of one or more selected decoders of at least one of the plurality of memory controllers to one or more selected decoders of at least another one of the plurality of memory controllers.

2. The system as recited in claim 1, wherein the plurality of memory controllers is configured to operate in an interleaved state, wherein a cache line address that is consecutive to a previous cache line address is mapped by a decoder of a different memory controller than a memory controller used to map the previous cache line address.

3. The system as recited in claim 1, wherein a number of decoders included on a given memory controller corresponds to a number of ways in which the plurality of memories is interleaved.

4. The system as recited in claim 1, wherein each memory controller controls access to a respective one of the plurality of memories, wherein each decoder maps a respective fixed-sized region of the respective one of the plurality of memories.

5. The system as recited in claim 1, wherein in response to an additional memory controller and respective memory being added to the plurality of memory controllers, the plurality of memory controllers is dynamically reconfigured during operation of the system such that a cache line address that is consecutive to a previous cache line address is mapped by a decoder of a different memory controller than a memory controller used to map the previous cache line address.

6. The system as recited in claim 5, wherein each of the decoders includes a plurality of registers configured to store values used to determine which bits of a cache line address are significant and to determine a value on which to match.

7. The system as recited in claim 6, wherein dynamically reconfiguring the plurality of memory controllers includes moving the contents of at least some of the plurality of registers from one or more selected decoders of at least one of the plurality of memory controllers to one or more selected decoders of at least another one of the plurality of memory controllers.

8. The system as recited in claim 1, wherein in response to a memory controller and respective memory being removed from the plurality of memory controllers, the plurality of memory controllers is dynamically reconfigured during operation of the system such that a cache line address that is consecutive to a previous cache line address is mapped by a decoder of a different memory controller than a memory controller used to map the previous cache line address.

9. The system as recited in claim 8, wherein each of the decoders includes a plurality of registers configured to store values used to determine which bits of a cache line address are significant and to determine a value on which to match.

10. The system as recited in claim 9, wherein dynamically reconfiguring the plurality of memory controllers includes moving the contents of at least some of the plurality of registers from one or more selected decoders of at least one of the plurality of memory controllers to one or more selected decoders of at least another one of the plurality of memory controllers.

11. A method for configuring a plurality of memory controllers coupled between a processor and a respective one of a plurality of memories, the method comprising:
providing on each of the plurality of memory controllers a plurality of decoders;
independently configuring each decoder to map a given cache line address by matching on a respective value of a subset of address bits received in a memory request;
executing one or more reconfiguration commands to dynamically reconfigure the plurality of memory controllers during system operation by moving a cache line mapping of one or more selected decoders of at least one of the plurality of memory controllers to one or more selected decoders of at least another one of the plurality of memory controllers.

12. The method as recited in claim 11, further comprising operating the plurality of memory controllers in an interleaved state by mapping a cache line address that is consecutive to a previous cache line address using a decoder of a different memory controller than a memory controller used to map the previous cache line address.

13. The method as recited in claim 11, wherein a number of decoders included on a given memory controller corresponds to a number of ways in which the plurality of memories is interleaved.

14. The method as recited in claim 11, further comprising configuring each decoder to map a respective fixed-sized region of a respective one of the plurality of memories.

15. The method as recited in claim 11, further comprising in response to adding an additional memory controller and respective memory to the plurality of memory controllers during operation of the system, dynamically reconfiguring the plurality of memory controllers by mapping a cache line address that is consecutive to a previous cache line address using a decoder of a different memory controller than a memory controller used to map the previous cache line address.

16. The method as recited in claim 15, further comprising storing values in a plurality of registers within each of the decoders to determine which bits of a cache line address are significant and to determine a value on which to match.

17. The method as recited in claim 16, wherein dynamically reconfiguring the plurality of memory controllers includes moving the contents of at least some of the plurality of registers from one or more selected decoders of at least one of the plurality of memory controllers to one or more selected decoders of at least another one of the plurality of memory controllers.

18. The method as recited in claim 11, further comprising in response to removing a memory controller and respective memory from the plurality of memory controllers during operation of the system, dynamically reconfiguring the plurality of memory controllers by mapping a cache line address that is consecutive to a previous cache line address using a decoder of a different memory controller than a memory controller used to map the previous cache line address.

19. The method as recited in claim 18, further comprising storing values in a plurality of registers within each of the decoders to determine which bits of a cache line address are significant and to determine a value on which to match.

20. The method as recited in claim 19, wherein dynamically reconfiguring the plurality of memory controllers includes moving the contents of at least some of the plurality of registers from one or more selected decoders of at least one of the plurality of memory controllers to one or more selected decoders of at least another one of the plurality of memory controllers.

* * * * *